United States Patent
Montag et al.

(10) Patent No.: US 7,908,984 B2
(45) Date of Patent: Mar. 22, 2011

(54) IRRIGATION SYSTEM AND METHOD FOR IRRIGATING OR FERTILIZING

(75) Inventors: Jurith Montag, Limburgerhof (DE); Hans-Joachim Fries, Limbrugerhof (DE); Alexander Wissemeier, Speyer (DE); Armin Alteheld, Bad Kreuznach (DE); Hans-Jürgen Quadbeck-Seeger, Bad Dürkheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/526,422

(22) PCT Filed: Feb. 5, 2008

(86) PCT No.: PCT/EP2008/051401
§ 371 (c)(1),
(2), (4) Date: Aug. 7, 2009

(87) PCT Pub. No.: WO2008/095932
PCT Pub. Date: Aug. 14, 2008

(65) Prior Publication Data
US 2010/0006015 A1    Jan. 14, 2010

(30) Foreign Application Priority Data
Feb. 8, 2007  (EP) .................................... 07101960

(51) Int. Cl.
*A01C 15/00* (2006.01)
(52) U.S. Cl. ........................ 111/200; 111/900
(58) Field of Classification Search .................. 111/118, 111/200, 900
See application file for complete search history.

(56) References Cited

U.S. PATENT DOCUMENTS

| 4,334,971 A | 6/1982 | Mahnke et al. |
| 4,617,225 A * | 10/1986 | Horn et al. ..................... 428/215 |
| 5,896,700 A | 4/1999 | McGough |
| 2005/0049321 A1 | 3/2005 | Baumgartl et al. |

FOREIGN PATENT DOCUMENTS

| DE | 9402159 U1 | 3/1994 |
| DE | 10011388 A1 | 11/2000 |
| DE | 202005018041 U1 | 1/2006 |
| EP | 0017672 A1 | 10/1980 |
| EP | 0037470 A1 | 10/1981 |
| EP | 0071672 A1 | 2/1983 |
| EP | 1505105 A1 | 2/2005 |
| WO | WO-0194436 A2 | 12/2001 |
| WO | WO-2005104821 A1 | 11/2005 |

OTHER PUBLICATIONS

U.S. Appl. No. 11/921,611, filed Dec. 6, 2007.
U.S. Appl. No. 12/064,349, filed Sep. 15, 2008.
U.S. Appl. No. 12/063,946, filed Feb. 15, 2008.
U.S. Appl. No. 12/376,808, filed Feb. 9, 2009.
U.S. Appl. No. 12/377,215, filed Feb. 11, 2009.
U.S. Appl. No. 12/466,536, filed May 15, 2009.
U.S. Appl. No. 12/517,703, filed Jun. 4, 2009.
U.S. Appl. No. 12/526,412, filed Aug. 7, 2009.
U.S. Appl. No. 12/526,404, filed Aug. 7, 2009.
U.S. Appl. No. 12/281,936, filed Sep. 5, 2008.
U.S. Appl. No. 12/282,449, filed Sep. 10, 2008.
U.S. Appl. No. 12/294,712, filed Sep. 26, 2008.
U.S. Appl. No. 12/294,813, filed Sep. 26, 2008.
U.S. Appl. No. 12/226,410, filed Oct. 17, 2008.
U.S. Appl. No. 12/373,168, filed Jan. 9, 2009.
U.S. Appl. No. 12/279,566, filed Aug. 15, 2008.
U.S. Appl. No. 12/526,430, filed Aug. 7, 2009.

* cited by examiner

Primary Examiner — Christopher J. Novosad
(74) Attorney, Agent, or Firm — Connolly Bove Lodge & Hutz LLP

(57) ABSTRACT

A watering apparatus comprising a storage container having a tubular section which is closed with an open-cell foam based on an aminoplast, and a method for watering or applying fertilizer.

4 Claims, No Drawings

IRRIGATION SYSTEM AND METHOD FOR IRRIGATING OR FERTILIZING

RELATED APPLICATIONS

This application is a national stage application (under 35 U.S.C. §371) of PCT/EP2008/051401, filed Feb. 5, 2008, which claims benefit of European application 07101960.8, filed Feb. 8, 2007.

BACKGROUND OF THE INVENTION

The invention relates to a watering apparatus comprising a storage container having a tubular section, which is closed with an open-cell foam based on an aminoplast, and a method for watering or applying fertilizer.

Open-cell foams based on a melamine/formaldehyde condensate are known for various heat- and sound-insulating applications in buildings and vehicles and as insulating and impact-absorbing packaging material.

German Utility Model G 94 02 159.7 U1 discloses a soil conditioner which comprises peat and an open-cell melamine/formaldehyde foam in the form of flakes, it also being possible to add plant soil, flower soil or grave soil. The soil conditioner is flowable and is introduced into the soil.

Plants which are present in flower pots or plant containers have to be watered more frequently than those which are directly in the ground (e.g. in flowerbeds) since the amount of soil in the pot is limited. Lawn plants and certain other garden plants, too, are sensitive to dryness and have to be watered frequently. The water storage capacity of said soil conditioner is not always satisfactory in these applications.

German Utility Model DE 20 2005 018 041 U1 therefore proposes water-storing webs which are in contact with plant soil or earth and comprise an open-cell melamine-formaldehyde foam.

For watering during long absence, indoor plants can be placed in a large tray on a watering mat and can be supplied with water using a hand towel which hangs over the edge into a second tray filled with water.

It is also known that empty water bottles or wine bottles can be used as watering aids. For this purpose, a bottle filled with water is inserted upside down into the earth. The plant extracts the required water from the bottle by the suction effect. By means of a watering sphere and a terracotta rod, the plants are also well supplied during long absence. The water seeps slowly and there is no need for the plants to dry out. The terracotta rod always releases exactly the required amount of water to the soil. However, clay candles are not suitable for applying nutrient solutions.

Watering aids based on hollow plastic cones which are screwed onto bottles and permit an exchange of liquid and gas via at least two holes are known and are available as commercial products. However, these systems are not self-regulating to the desired degree. If the known systems are removed from the substrate, water continues to run out and handling is difficult.

BRIEF SUMMARY OF THE INVENTION

The invention relates to a watering apparatus comprising a storage container having a tubular section, which is closed with an open-cell foam based on an aminoplast.

It was an object of the present invention to provide a simple watering apparatus and a method for watering or applying fertilizer, which method does not have the abovementioned disadvantages and permits in particular long and uniform watering of pot plants.

Accordingly, the abovementioned watering apparatus was found.

Preferably used open-cell foams are resilient foams based on an aminoplast, in particular a melamine/formaldehyde condensate, having a specific density of 3 to 100 g/l, in particular from 5 to 20 g/l. The cell count is usually in the range of from 50 to 300 cells/25 mm. The tensile strength is preferably in the range of from 100 to 150 kPa and the elongation at break in the range of from 8 to 20%.

For various fields of use, it may be advantageous that the open-cell foam in different tube sections has a different pore size distribution, for example in the form of a linear or exponential gradient from large pores to small pores. Thus, for example, the cell count may be in the range of from 50 to 120 cells/25 mm at the beginning of the tubular section and in the range of from 150 to 300 cells/25 mm at the end.

For production, according to EP-A 017 672 or EP-A 037 470 a highly concentrated, growing agent-containing solution or dispersion of a melamine-formaldehyde pre-condensate can be foamed using hot air or steam or by microwave irradiation and cured. Such foams are commercially available under the name Basotect® from BASF Aktiengesellschaft.

The molar melamine/formaldehyde ratio is in general in the range of from 1:1 to 1:5. For the production of particularly low-formaldehyde foams, the molar ratio is chosen to be in the range of from 1:1.3 to 1:1.8 and a pre-condensate free of sulfite groups is used, as described, for example in WO 01/94436.

In order to improve the performance characteristics, the foams can subsequently be annealed and pressed. By means of this processing step, the surface form of the foam, the hydrophilicity, the density and the pore size can be modified. The customary method for thermoforming the material takes place by impregnation with an adhesive and curing of the adhesive in a deformation step of the impregnated foam. it is also possible to generate a thermoformable material without addition of a further assistant, as described in EP1 505 105.

Control of the pore structure of the foam by the process of thermoforming can be effected by pressing different regions of the foam to different extents. By heating the deformed test specimen, it can be fixed in the new form. It is possible to produce a test specimen having a density and pore size gradient. For example, a wedge-shape test specimen can be deformed by means of a planar pressing apparatus, or a planar test specimen by means of a wedge-shaped pressing apparatus, and can be fixed in the gradient structure. It is also possible to combine a plurality of bodies with different degrees of compression. The gradient or integral structure obtained may also be advantageous with regard to the mechanical properties.

The foams can be cut to the desired shape and thickness. Contour cuts by means of which, for example, foam bodies having a larger surface area are obtainable are also possible.

The melamine/formaldehyde foams may be made hydrophobic and/or oleophobic, as described, for example, in DE10011388. By combining unmodified and water-repellent foams, liquid-liquid separations can be achieved. It may be advantageous to combine a plurality of elements of this type in order to enhance the effect.

The watering apparatus or individual parts, such as tube, tube feed lines and storage container, consist as a rule of a distortion-resistant material, such as glass, metal, e.g. steel or aluminum, unreinforced or fiber-reinforced plastic. Suitable plastics are, for example, polyethylene, polypropylene or epoxy or polyester resins, which, if appropriate, may be reinforced with carbon or glass fibers, woven fabrics or mats.

The tube or the tubular section of the watering apparatus is as a rule elongated, for example cylindrical, and has a circular, oval or polygonal cross section. The tube preferably has a diameter in the range of from 1 to 100 mm, particularly preferably from 5 to 50 mm. The length of the tube or tube section filled with the open-cell foam is preferably in the range of from 5 to 500 mm, particularly preferably from 10 to 100 mm.

Owing to the resilience of the open-cell foam in the temperature range from about −180° C. to +200° C., said foam can be inserted in a simple manner into prefabricated tubes or container parts. Even at low temperatures, for example below −80° C., the foam remains resilient.

As a rule, the open-cell foam is punched out or cut out to fit exactly and is introduced into the tube. However, it is also possible to fit a foam piece having a non-uniform cross section into a tube having a uniform cross section. The size of the cells and the number of cells per unit volume are changed along the tube thereby. For example, a conical foam piece can be fitted into a cylindrical tube so that the cell size decreases continuously from one end to the other end.

The foam can also be inverted over the open end of the tube and fastened to the tube from the outside without projecting into the interior. It may be advantageous to use the foam as an inlay in the interior of a perforated screw cap. In this case, the foam can be fastened by simply screwing on.

The open-cell foam can be fastened in a tube by an adhesive bond or mechanical holder. Inaccuracies of fit can be compensated by sealing materials (e.g. based on silicone).

The tubular section filled according to the invention with the open-cell foam can be connected to a storage container directly or via a further tube or hose connecting piece. Depending on use, it can also be combined with further filled or unfilled tubes to give a tube assembly.

A watering apparatus having a conical or bottle-like storage container and a tubular neck mounted thereon, e.g. a commercially available glass or plastic bottle, is particularly suitable.

The tubular section filled according to the invention with the open-cell foam is suitable for filtering liquids, for example for removing suspended materials from the water or the fertilizer solution.

DETAILED DESCRIPTION OF THE INVENTION

A tube into which a conical foam piece was pressed and in which the cell structure of the open-cell foam fitted in changes continuously from coarse-cell to fine-cell can also preferably be used for the filtration. The medium to be filtered is then poured onto the coarse-cell end, the coarse suspended materials being preferentially taken up first into the pores of the foam, and the fine suspended materials at the end. As a result of this effect, the pressure drop at the filter material is smaller compared with a filter which consists only of small pores. By means of the gradient structure, it is possible for the particles filtered off to be distributed throughout the material and not just to form a filter cake on the surface, which filter cake leads to a large pressure drop. The filtration of coarse particles which do not penetrate into the foam structure may be improved by increasing the surface area of the foam body.

The tube according to the invention, connected to a storage container, for example in the form of a bottle having a tapering bottle neck, is excellently suitable for continuously watering and/or applying fertilizer to plants. If a piece of an open-cell melamine/formaldehyde resin foam is immersed in water, the latter rises about 0.8 cm until an equilibrium is established between the capillary force and hydrostatic and atmospheric pressure. If a bottle filled with water is closed with such a piece of an open-cell melamine/formaldehyde resin foam and turned upside down, the pores of the foam fill with water and seal the bottle so that no air can penetrate for pressure equilibration. As soon as the bottle with the foam is placed upside down on a beaker filled with sand, the water penetrates through the foam into the sand until the latter is completely moistened. Water then flows only at the rate at which the water evaporates from the sand surface. In this way, it is possible to produce a simple watering system, for example from polyethylene beverage bottles. In addition to the watering, fertilizer and crop protection agent can also be metered continuously with the water. If the bottle is removed from the sand, the flow of the water stops. The bottle does not leak even when the opening is directed downward.

With the aid of the watering apparatus according to the invention, plants can be watered and supplied with fertilizer permanently and uniformly. A sand layer which is from 1 to 50 mm, in particular from 5 to 30 mm, thick is particularly preferably placed in the substrate to be watered or in the tubular section directly connected to the substrate.

If the sand layer is too thick, the storage container is completely emptied within a few hours, regardless of the type and initial saturation of the substrate and of the surface or the contact area. This results in wetting of the substrate, emergence of water from the pot and high water consumption.

In the method according to the invention, it is also possible to use fertilizer or crop protection agents. The fertilizers may be both single-nutrient and multi-nutrient fertilizers. All customary fertilizers components are conceivable as constituents of these fertilizers, it being possible to use, for example, ammonium sulfate, ammonium nitrate, ammonium chloride, a mixture of ammonium sulfate and nitrate, urea, cyanamide, dicyandiamide, sodium nitrate, Chile saltpetre and calcium nitrate and long-term fertilizers, such as oxamide, urea-formaldehyde, urea-acetaldehyde or urea-glyoxal condensate, for example ureaform, acetylenediurea, isobutylidenediurea or crotonylidenediurea, as nitrogen sources. Furthermore, compounds which comprise one or more of the plant nutrients phosphorus, potassium, magnesium, calcium or sulfur and compounds which comprise the trace elements boron, iron, copper, zinc, manganese or molybdenum may also be present. Examples of such compounds are monoammonium phosphate, diammonium phosphate, superphosphate, Thomas meal, triple superphosphate, dicalcium phosphate, potassium phosphate, partly or completely digested crude phosphates, potassium nitrate, potassium chloride, potassium sulfate, dipotassium phosphate, magnesium sulfate, magnesium chloride, kieserite, dolomite, lime, colemanite, boric acid, borax, iron sulfate, copper sulfate, zinc sulfate, manganese sulfate, ammonium molybdate or similar substances. The fertilizers may also comprise one or more active substances, such as, for example, nitrification inhibitors, urease inhibitors, herbicides, fungicides, insecticides, growth regulators, hormones, pheromones or other crop protection agents or soil assistants, in amounts of from 0.01 to 20% by weight, based on the fertilizer. Furthermore, complexing agents, such as EDTA or EDDHA, may also be present.

The use of multi-nutrient fertilizers, in particular those having a long-term effect, which comprise, for example, compounds such as ureaform, acetylenediurea, isobutylidenediurea or crotonylidenediurea as a nitrogen source, is preferred. The use of coated fertilizers in which the fertilizer granules are surrounded by a thin polymer membrane is furthermore preferred. Coated fertilizers are distinguished by delayed nutrient release and are known per se to the person skilled in the art.

Suitable crop protection agents are, for example, insecticides, fungicides, growth regulators and herbicides, if appropriate in combination with corresponding safeners. Systemic active substances which are taken up by the plants via the roots are preferred.

Particularly on supplying fertilizer and under the action of light, it is expedient to add additives which limit or suppress the growth of algae on the surface.

For reducing the evaporation, the substrate can be covered with a sheet, for example of plastic or aluminum, with recesses for the tubular section of the watering apparatus. The watering apparatus according to the invention is produced from economical parts. It is suitable in particular for the long-term watering of balcony plants and indoor plants. The open-cell pores do not become blocked. Complicated mechanical or electronic control is not necessary.

EXAMPLES

Example 1

A bottle filled with water was closed with a stopper comprising an open-cell melamine/formaldehyde foam having a density of about 10 kg/m$^3$ (Basotect® from BASF Aktiengesellschaft) and placed upside down. No water runs out of the bottle. The bottle was placed with the opening facing downward in a beaker filled with sand. The amount of liquid which was sufficient for moistening the sand emerged from the bottle. As soon as the sand was completely moistened, the emergence of the liquid stopped. In this way, the sand remained moist over several weeks, water seeping continuously from the bottle according to the evaporation.

If a bottle without the use of foam is quickly turned around and inserted with the opening facing downward into the sand, the total contents of the bottle run out and there is no self-regulation of the system unless the bottle is handled with a very great deal of skill.

Example 2

Water Lock

The bottom of a customary 1.5 l PET beverage bottle is cut off so that the lower part consists of an open cylinder having a diameter of about 7 cm. The bottle closure is retained. A disk of Bastoect having a matching diameter and a height of about 1.5 cm is fitted into the opening. The closure of the bottle is opened and the bottle is dipped, with the bottom closed by means of Basotect®, about 5 cm into a vessel filled with water. Water penetrates through the Basotect® disk into the interior of the bottle, the corresponding amount of air escaping through the opened closure. If the bottle with the opened closure is raised, the water present above the Basotect® disk flows out of the bottle. If the closure of the bottle is closed after entry of the water, no liquid runs out on removing the bottle from the water, since no gas exchange can take place. If the closure is then opened the water can run out of the bottle. The water release can be controlled by the gas exchange.

Example 3

Gas Exchange

An opening having a diameter of 2 cm is cut into the plastic screw closure (diameter about 3 cm) of a customary 500 ml PET beverage bottle. A thin Basotect® nonwoven (thickness about 1 mm) having a diameter of about 3 cm is fastened behind the opening. The bottle is filled with water without the modified lid. The bottle is then closed with the lid and held with the lid facing downward. No water passes through the Basotect® nonwoven. Even a very thin Bastoect® nonwoven which is impregnated with water prevents gas exchange.

Example 4

Watering of Plants

Plastic containers (Ø=16 cm) were filled to the rim with a substrate mixture (1:1 v/v) of a loamy sand ("Limburgerhof soil") and a pot soil (Floradur). The substrate mixture was moistened to 60% of its maximum water capacity. Young Chinese cabbage plants (12 days old) were planted in the substrate. The containers were watered by four different variants:

| | |
|---|---|
| Variant a) (control): | Watered as customary in gardening (every second day) |
| Variant b): | Bottle |
| Variant c): | Bottle + Basotect |
| Variant d): | Bottle + Basotect + sand |

1 l plastic bottles (neck length=3.0 cm; internal neck diameter=2.3 cm), Basotect cylinders (diameter=2.4 cm, height=2 cm) and pure sand were used as material with a different watering variant. The bottles filled with water, either not closed, closed only with the Basotect cylinder or closed with Basotect cylinder and sand layer (1 cm), were inverted and inserted into the substrate. The inversion of the bottle which had not been closed resulted in a water loss of about 50 ml per bottle. Owing to the material properties of Basotect, no water emerged from the bottles closed with Basotect cylinders. The experiment was evaluated after 15 days when the bottles of variant 4 were empty. The water consumption of variants 2 to 4 and the fresh weight of the sprout of each plant were determined. The results of the use examples are summarized in table 1.

TABLE 1

| | Fresh weight of sprout [g] | | Water consumption [ml] | |
|---|---|---|---|---|
| Example | Mean value | Standard deviation | Mean value | Standard deviation |
| 4a | 39.2 | 4.1 | | |
| 4b | 25.6 | 2.7 | 230 | 50 |
| 4c | 25.4 | 2.4 | 143 | 31 |
| 4d | 41.9 | 4.7 | 1000 | 0 |

We claim:
1. A method for watering or applying fertilizer on a substrate which comprises:
   filling a watering apparatus, with water or an aqueous fertilizer solution or suspension, wherein the watering apparatus comprises a storage container and a tubular section comprising an open-cell foam based on an aminoplast and placing the tubular section in contact with the substrate;

wherein a 1 to 50 mm thick layer of sand is present between the open-cell foam and the substrate.

2. The method of claim 1, wherein the open-cell foam consists of a melamine/formaldehyde resin.

3. The method according to claim 1, wherein the fertilizer suspension comprises a solid or a coated fertilizer.

4. The method according to claim 1, wherein the water or fertilizer solution comprises a crop protection agent.

* * * * *